J. F. KELLY.
LAVATORY.
APPLICATION FILED AUG. 19, 1916.
1,204,033.
Patented Nov. 7, 1916.
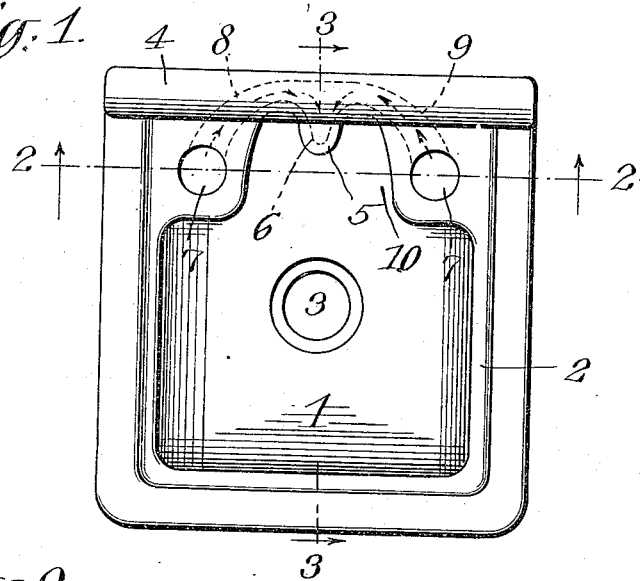
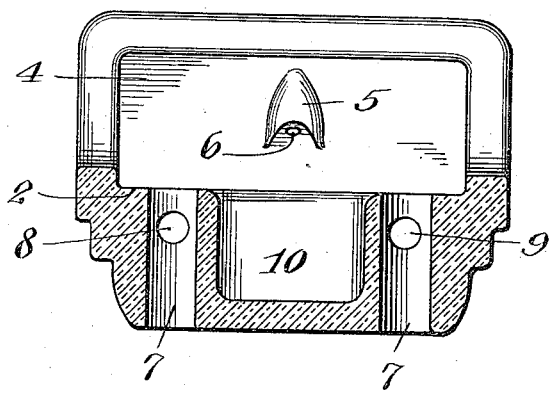
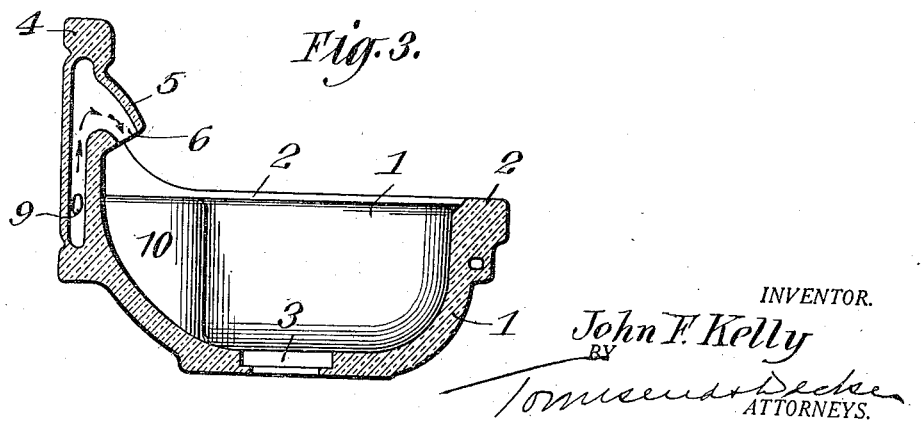
INVENTOR.
John F. Kelly
BY
Townsend & Decker
ATTORNEYS.

UNITED STATES PATENT OFFICE.

JOHN F. KELLY, OF TRENTON, NEW JERSEY, ASSIGNOR TO THOMAS MADDOCK'S SONS COMPANY, OF TRENTON, NEW JERSEY, A CORPORATION OF NEW JERSEY.

LAVATORY.

1,204,033.  Specification of Letters Patent.  Patented Nov. 7, 1916.

Application filed August 19, 1916.  Serial No. 115,785.

*To all whom it may concern:*

Be it known that I, JOHN F. KELLY, a citizen of the United States, and a resident of Trenton, in the county of Mercer and State of New Jersey, have invented certain new and useful Improvements in Lavatories, of which the following is a specification.

My present invention relates to lavatories made of porcelain or similar earthenware and particularly to such articles made in small sizes for use as dental lavatories and wash basins for closets and other places where a small space only is available.

The object of the invention is to provide a neat, compact lavatory which, although small and requiring but little space, will have all the usefulness of the large lavatories.

The invention consists in the novel construction and arrangement of lavatory hereinafter more particularly described and then specified in the claims.

In the accompanying drawings: Figure 1 is a plan view of a lavatory constructed in accordance with this invention. Fig. 2 is a longitudinal vertical section taken on the line 2—2 of Fig. 1. Fig. 3 is a transverse vertical section taken on the line 3—3 of Fig. 1.

By preference the lavatory is designed to be suspended from the wall or other support and is preferably all formed integral, that is the bowl, slab, back and supply nozzle are all formed of porcelain in one piece whereby the beauty of the fixture as well as its solidity and sanitary qualities are maintained.

1 indicates the bowl and 2 the slab around the edge of the bowl, the bowl and slab being preferably formed of porcelain molded in one piece. The bowl may be round, oval or of any desired shape and is provided with the usual outlet 3 in the bottom thereof.

The slab 2 at the rear of the bowl is preferably provided with a flat back 4 rising for a considerable distance above the plane of the slab and adapted to bear flat against the wall or other support from which the lavatory is suspended.

5 indicates the supply nozzle preferably integral with the raised back 4 and projecting forward from said back at a point preferably considerably above the plane of the slab 2 and somewhat beneath the top of the back. The supply nozzle 5 is arranged in line with the center of the bowl 1 and is provided with a passage 6 through which the water is directed to the bowl.

7 indicates openings formed in the slab 2 for the reception of hot and cold water faucets of any desired type, the faucets being secured to the lavatory in any suitable manner.

8 and 9 indicate channels or passages leading from the openings 7 to the supply passage 6 and through which water from the faucets located in the openings 7 is delivered to the supply nozzle 5.

To permit the bowl being made small in size and consequently maintaining the lavatory of small size and at the same time to allow the insertion of an article, such as a drinking glass or a bowl, beneath the supply nozzle, which only projects a short distance from the back 4, I provide a recess 10 in the rear wall of the bowl directly beneath the supply nozzle and symmetrical therewith. The recess preferably starts at the rim of the bowl and terminates at the bottom and is of such size that an article such as a drinking glass can be readily inserted. By this arrangement it will be observed that all the advantages of a large lavatory are maintained and at the same time but little space is required thus permitting the installation of the lavatory in places where lavatories of standard size cannot be used.

What I claim as my invention is:

1. In a porcelain lavatory, a bowl, an integral back rising from the top thereof and an integral supply nozzle for said bowl projecting forward from said back at a point above the level of the bowl.

2. In a porcelain lavatory, a bowl, a slab integral therewith, an integral back rising above said slab, an integral supply nozzle for said bowl projecting forward from said back above said slab and supply passages leading from the slab through the back to said nozzle.

3. In a porcelain lavatory, a bowl, a back rising above the top thereof and integral therewith and a supply nozzle projecting forwardly from said back above the top of the bowl, said bowl being provided with a recess in the rear wall beneath said nozzle.

4. In a porcelain lavatory, a bowl, a slab integral therewith, an integral back rising above said slab and an integral supply nozzle projecting forward from said back at a point above said slab, said bowl being provided with a recess in the rear wall thereof symmetrically arranged beneath said nozzle.

Signed at Trenton, in the county of Mercer and State of New Jersey, this 14th day of August, A. D. 1916.

JOHN F. KELLY.

Witnesses:
ALBERT WHITE,
WM. J. WHARTON, Jr.

Copies of this patent may be obtained for five cents each, by addressing the "Commissioner of Patents, Washington, D. C."